(12) United States Patent
Hanser et al.

(10) Patent No.: US 6,186,692 B1
(45) Date of Patent: Feb. 13, 2001

(54) LOCKING MECHANISM FOR EXPANDABLE ROOMS

(75) Inventors: Paul E. Hanser, Tipton; Stacy Hanser, Davenport, both of IA (US)

(73) Assignee: HWH Corporation, Moscow, IA (US)

( * ) Notice: Under 35 U.S.C. 154(b), the term of this patent shall be extended for 0 days.

(21) Appl. No.: 09/197,379

(22) Filed: Nov. 20, 1998

(51) Int. Cl.[7] .................................................... F16B 2/04

(52) U.S. Cl. ............................ 403/31; 52/79.5; 403/338; 403/360; 403/361

(58) Field of Search ............................ 403/31, 292, 338, 403/360, 361; 521/79.5; 296/165

(56) References Cited

U.S. PATENT DOCUMENTS

| | | |
|---|---|---|
| 2,226,078 | 12/1940 | Spahn . |
| 2,266,344 * | 12/1941 | Staerker ................................ 403/360 |
| 3,070,015 | 12/1962 | Ledwith . |
| 3,122,383 | 2/1964 | Hirsch . |
| 4,648,736 | 3/1987 | Harsch et al. . |
| 4,728,217 | 3/1988 | Fink . |

FOREIGN PATENT DOCUMENTS

3300227 A1    7/1984  (DE) .

\* cited by examiner

*Primary Examiner*—Michael Safavi
(74) *Attorney, Agent, or Firm*—James C. Nemmers

(57) ABSTRACT

A locking mechanism that includes a multi-dimensional connecting locking pin which provides a structural link between two structural members that can be repeatedly separated and locked together. The connecting pin is comprised of a tapered shaft extending through a radially expandable split ring with the tapered shaft being moveable between housings located on each of the two separate structural members. As the tapered shaft moves through the radially expandable split ring, the ring is expanded outwardly to engage locking grooves in both housings to lock the structural members together. The tapered shaft is actuated by a hydraulic cylinder that forces the tapered shaft through a first stage in which the receiver housing is first aligned with the other housing, and after proper alignment is achieved, a second stage of the tapered shaft expands the split ring into a locking position. In this manner, the two structural members are positively and properly aligned and locked, and once locked in place, the locking pin provides both shear resistance and tensile and compressive strength that exceeds the strength of the two structural members had they been a single piece.

7 Claims, 4 Drawing Sheets

LOCKING MECHANISM FOR EXPANDABLE ROOMS

BACKGROUND OF THE INVENTION

This invention relates to a locking mechanism for expandable rooms that are moveable between extended and retracted positions. The invention relates particularly to a locking mechanism for positively locking and holding the structure in place when the room is retracted.

Recreational vehicles, both self-propelled and towed, are obviously limited in size, especially width since they must move over the road and comply with federal and state regulations regarding size. Since these vehicles are used for temporary and sometimes longer term habitation, there have been designed rooms or portions of rooms that can be moved from a retracted to an extended position in order to provide additional living accommodations. Typically, once the vehicle is parked and secured, a room or one portion of a room is extended outwardly, usually to the side, to provide the additional desired space. When the vehicle is driven, the room is retracted so that it nests within the vehicle commonly with the outer wall of the expanded room in alignment with the outer wall of the vehicle from which it was extended.

Because these expandable rooms extend generally from the bottom to the top of the side wall of the vehicle, they necessarily disrupt the structural integrity of the side wall. Then, when the vehicle is moved over the road, vibrations and forces created during motion can further disrupt the structural integrity producing undesirable effects. Also, when the room is fully retracted, it must be completely sealed from water, dirt and other foreign matter and that seal must be maintained while the vehicle is moving over the road. Therefore, a positive locking mechanism to secure the room in a fully retracted position must provide both shear and tensile and compressive strength. In addition, because the room can be slightly out of alignment when it is moved from the extended to the retracted position, the locking mechanism must also function to properly align the room so that when it is locked in the fully retracted position, the structural integrity and seal will be fully maintained. There is therefore a need for an improved locking mechanism for expandable room structures which will meet the foregoing requirements.

SUMMARY OF THE INVENTION

The locking mechanism of the invention includes a multidimensional connecting pin that provides a structural link between two relatively moveable components, such as structural members, that can be repeatedly separated and locked together. The connecting pin is comprised of a tapered shaft extending through a radially expandable split ring with the tapered shaft being contained within a first actuating housing that is mounted on one of the structural members. The tapered shaft containing the split ring is moveable into and out or a receiver housing mounted on the other structural member. Once the tapered shaft has advanced into the receiver housing, and as the tapered shaft moves through the radially expandable split ring, the ring is expanded outwardly to engage locking grooves in both housings to lock the structural members together. The tapered shaft is actuated by a hydraulic cylinder that forces the tapered shaft through a first stage in which the receiver housing is first aligned with the other housing, and after proper alignment is achieved, a second stage of the tapered shaft expands the split ring into a locking position. In this manner, the two structural members are positively and properly aligned and locked, and once locked in place, the locking pin provides both shear resistance and tensile and compressive strength that exceeds the strength of the two structural members had they been a single piece.

DESCRIPTION OF THE PREFERRED EMBODIMENT OF THE INVENTION

The invention is for a locking mechanism for positively locking together two members, such as structural components, which are repeatedly separated and joined together and which are subjected to a variety of forces. The invention is illustrated in connection with room extensions for vehicles, especially those having habitable quarters. For example, recreational vehicles can be provided with a room extension that is retracted when the vehicle is being driven over the road and then extended when the vehicle is stationary so as to provide additional living space within the vehicle. In order to provide extendable rooms for vehicles of this type, it obviously is necessary to interrupt the structural members that form the basic exterior side wall of the vehicle. Ideally, these structural members are incorporated in the exterior wall of the extendable room. However, when the room is fully retracted and the vehicle driven over the road, it is necessary to restore the structural integrity of the side wall so that it is ideally at least as strong and rigid as the side wall would have been before installation of the expandable or extendable room. The invention is therefore directed to a mechanism for positively locking the expandable room in place while retaining the necessary structural strength and rigidity. This requires a mechanism that will withstand shear and tensile and compressive forces to the same degree as the original structure. In addition, because alignment of the extendable room when fully retracted can vary slightly because of the tolerances in the mechanism for supporting, extending and retracting the room, the mechanism must provide for properly realigning the structural members of the room and wall prior to positively locking them together.

Figure 1:
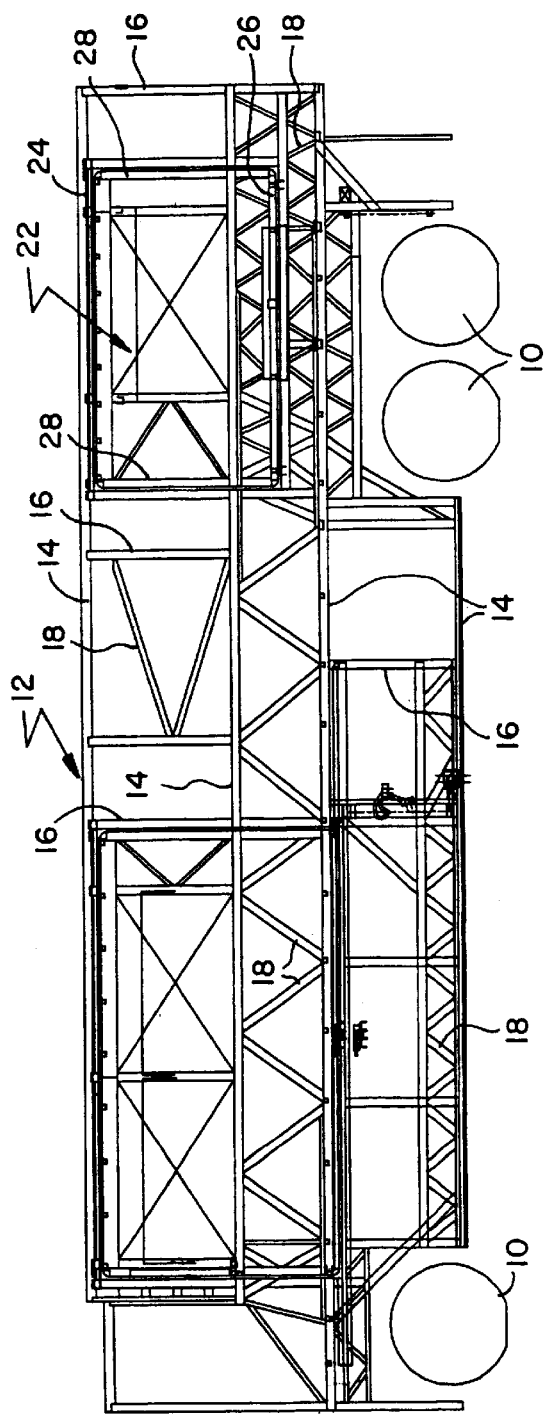
FIG. 1 is a side elevational view of the basic structural skeleton of a vehicle showing an extendable room.
Figure 2:
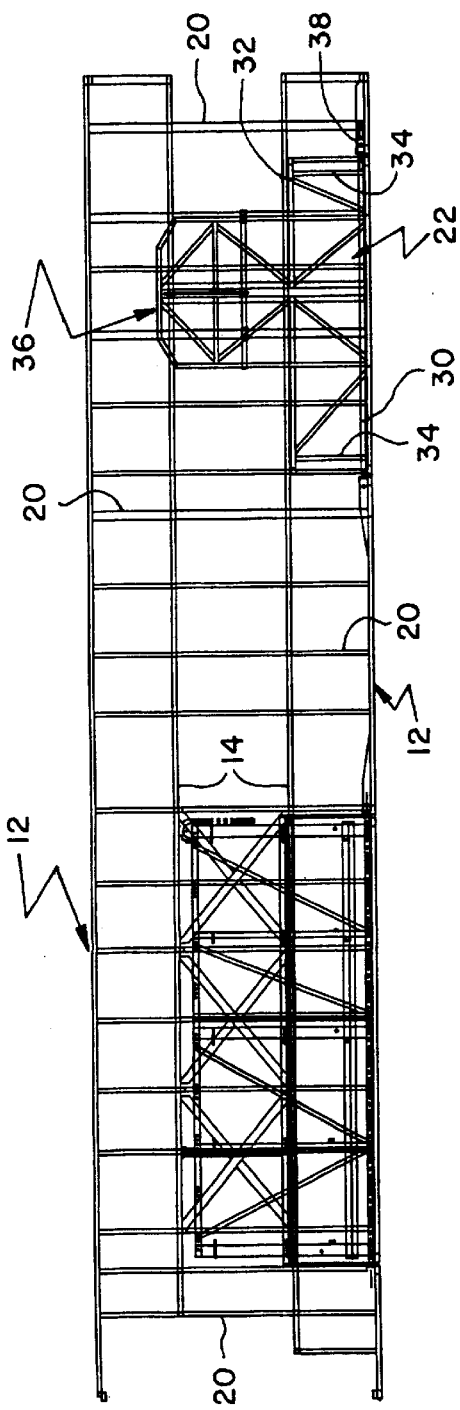
FIG. 2 is a top elevational view of the structural skeleton of FIG. 1.

Referring first to FIGS. 1–4, there is illustrated a basic and typical structural framework for a recreational vehicle which is mounted for movement on ground wheels 10. The side walls 12 are comprised of a series of horizontal longitudinally extending structural beams 14 which are spaced apart at different elevations along the side wall 10. The longitudinal beams 14 are connected together by spaced apart vertical members 16, and suitable braces 18 add rigidity to the horizontal beams 14 and vertical members 16. As illustrated in FIG. 2, the two side walls 12 are joined by cross members 20. Obviously, the complete structural framework for a vehicle of any type will include other details, and the details described herein are shown by way of illustration.

Figure 3:
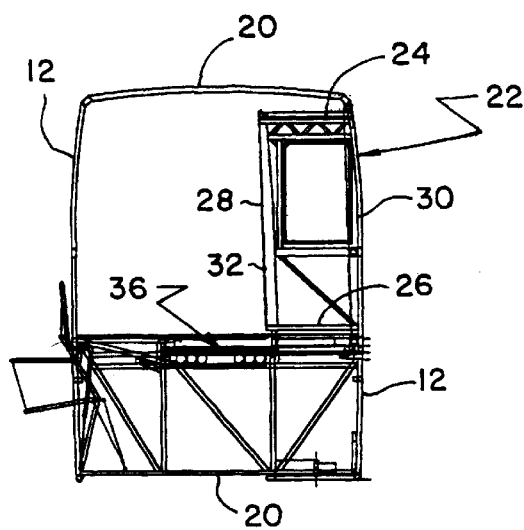
FIG. 3 is an end view of the structural skeleton of FIGS. 1 and 2 and showing the room in the retracted position.
Figure 4:
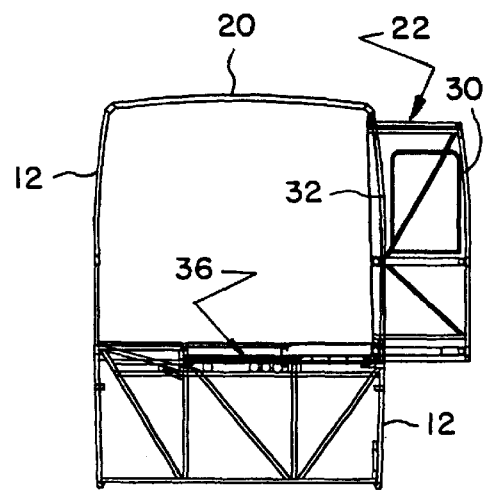
FIG. 4 is an end elevational view similar to FIG. 3 but showing the room in a fully extended position.

In the structural framework illustrated in FIGS. 1–4, there is positioned near the rear of the vehicle (the right side of FIGS. 1 and 2) the framework for an expandable room, which framework is indicated generally by the reference numeral 22. Although shown as positioned near the rear of the vehicle, it should be understood that this room may be positioned anywhere desired within the vehicle. The expandable room framework includes longitudinally extending upper and lower beams 22 and 24 which are connected by vertical structural members 28 that form the outer side wall 30 of the expandable room 22. Similar structural members form an inner side wall 32, and the side walls 30 and 32 are connected by suitable cross members 34. Additional suitable bracing is also typically included to provide rigidity to the expandable room 22 as well as the necessary structure, indicated generally by the reference numeral 36, to contain the extension mechanism for extending and retracting the room. The details of this structure and mechanism are not shown since they form no part of the invention and are known to those skilled in the art. FIGS. 3 and 4 illustrate the expandable room 22 in the fully retracted position (FIG. 3) and in the fully extended position (FIG. 4).

Figure 5:
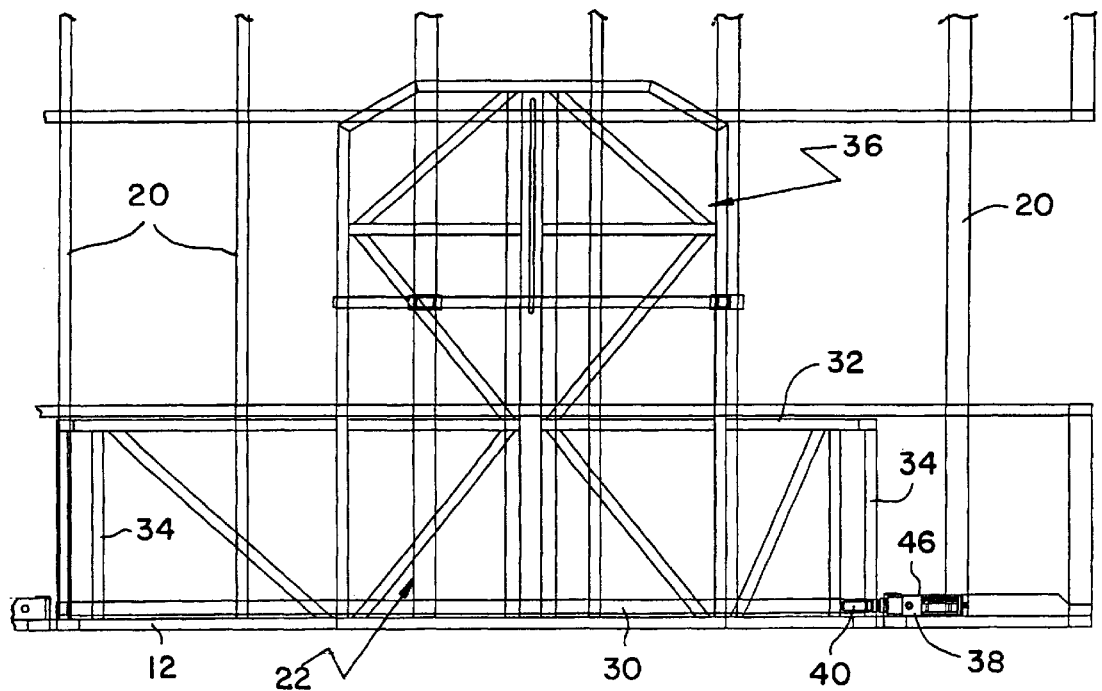
FIG. 5 is an enlarged view of a portion of the top view of FIG. 2 to more clearly show the locking mechanism in place.
Figure 6:
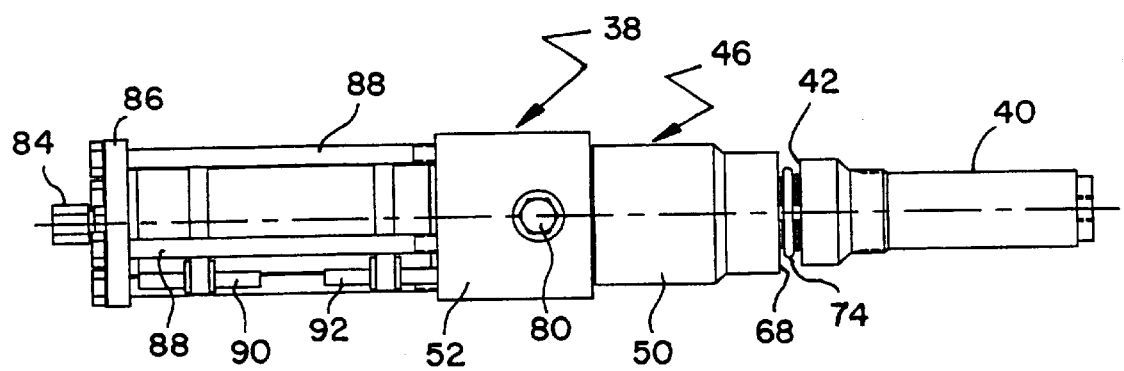
FIG. 6 is a top view of the locking mechanism.
Figure 7:
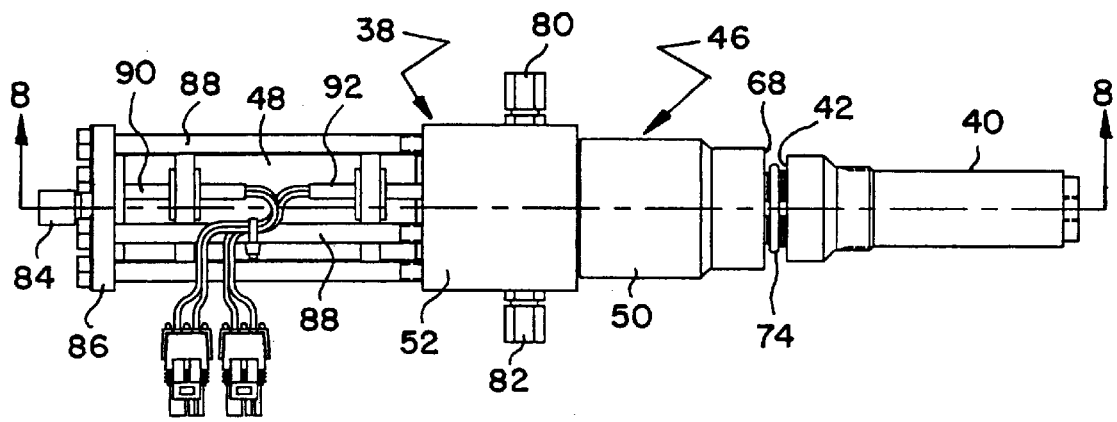
FIG. 7 is a side elevational view of the locking mechanism of FIG. 6.

FIG. 5 is an enlarged view of a portion of the top view of FIG. 2 which shows the position of the locking mechanism of the invention relative to the structural members of the wall 12 and the expandable room 22. The locking mechanism is indicated generally by the reference numeral 38. In the drawings, the locking mechanism 38 is shown as being positioned along the lower rear corner of the expandable room 22, being secured to one of the horizontal beams 14 of the side wall 12 with the receiver portion of the locking mechanism 38 being secured to the corresponding lower beam 26 of the expandable room 22. It should be understood that in a typical installation, more than one locking mechanism 38 may be used. Typically, at least two of the mechanisms 38 are used, one on each end of the expandable room 22, and in some instances four such mechanisms 38 may be necessary, one at each of the four corners of the outer side wall 30.

Figure 8:
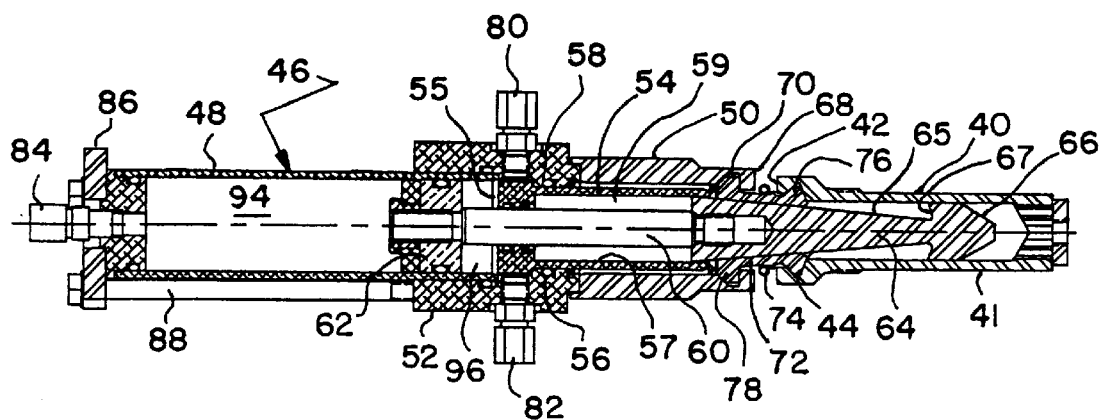
FIG. 8 is a longitudinal sectional view of the locking mechanism of FIG. 7 taken on the line 8—8 of FIG. 7.

Referring now to FIGS. 6–10, the locking mechanism 38 is shown in detail. A receiver housing 40 that has an annular wall 41 is fixedly secured to one of the structural members of the expandable room 22. In the drawings, the receiver housing 40 is shown as being secured to the lower beam 26 so that the open end 42 of the receiver housing 40 faces outwardly from the expandable room 22. As best seen in FIG. 8, the receiver housing 40 contains a locking element in the form of locking groove 44 formed around the inner surface of the annular wall 41 near the open end 42.

Fixedly secured in any suitable manner to one of the horizontal beams 14 is the actuating mechanism housing indicated generally by the reference numeral 46. The housing 46 is positioned on beam 14 so as to be in alignment with the receiver housing 40 when the components are in position for locking together. The actuating mechanism housing 46 includes a barrel 48 extending outwardly from one end of the housing 46 with the barrel 48 being received in a rod guide 50 that in turn is connected to a cylinder 52. A piston 54 is axially moveable inside of the cylinder 52, the piston having a shoulder 56 that engages a corresponding shoulder 58 formed inside of the rod guide 50 to limit axial movement of the piston 54. Piston 54 also has an annular wall 57 extending outwardly that defines a chamber 59. A rod 60 extends through the base 55 of piston 54 for axial movement relative to piston 54, one end of the rod 60 being connected to a second piston 62 slideably moveable inside of the barrel 48. Thus, a fluid tight chamber 96 is formed in the barrel 48 between the piston 54 and the piston 62. Another fluid tight chamber 94 is formed in the barrel 48 between the piston 62 and the end cap 86.

The end of the rod 60 opposite to that connected to the piston 62 extends into the chamber 59 where it is connected to a mandrel 64 that has a tapered main body 65 joined to a tapered tip or nose 66, the outer diameter of which is sized so that the nose 66 will slideably move inside of the chamber 59 and inside the receiver housing 40. The nose 66 provides a shoulder 67 between the nose 66 and main body 65. Formed along the inside surface of the rod guide 50 near its open end 68 is a locking element or groove 70. Carried by and surrounding the outside surface of the mandrel 64 is a locking member that in the preferred embodiment is a split ring 72, the inner surface of which is tapered so as to correspond to the tapered outer surface of the mandrel 64. The split ring 72 is preferably formed into two or more segments that are held together by a spring 74. In its normal unlocking position, the segments of the split ring 72 are held together by spring 74 when the ring 72 is positioned just behind the nose 66 against the shoulder 67 of the mandrel 64. This is the position shown in FIG. 9. The split ring 72 has formed on its outer surface a first locking element in the form of projection 76 near one end and a second locking element in the form of projection 78 near the other end. The projections 76 and 78 are spaced apart a predetermined distance determined by the distance between the locking groove 70 in the actuating mechanism housing 38 and the locking groove 44 in the receiver housing 40. Because the main body 65 of the mandrel 64 is tapered, as the mandrel 64 moves relative to the split ring 72, the segments of the split ring 72 will be forced outwardly against the resistance of spring 74 so that the projections 76 and 78 will engage in the locking grooves 44 and 70. This will be more evident from the description of the operation of the locking mechanism set forth hereinafter.

In order to power the locking mechanism, connectors 80 and 82 are provided on opposite sides of the rod guide 50 to provide for connection to a suitable hydraulic system. Similarly, at the end of the barrel 48 is a connector 84 for connection to the hydraulic system. An end cap 86 and connecting rod 88 secure the barrel 48 to the rod guide 50 to complete the assembly. The hydraulic system operates on a closed circuit regenerative cycle and contains a fluid pump (not shown) that is always connected to the chamber 96. Thus, when fluid pressure is applied to the piston 62, both piston 62 and piston 54 will be advanced until the shoulder 56 of piston 54 engages the shoulder 58 at which time the piston 62 will continue to advance because of the difference in the areas at the base of piston 62 and the base 55 of piston 54. Fluid in chamber 96 will be returned to chambers 94 because of the regenerative hydraulic system.

A magnet 89 is secured to the back of piston 62, and a pair of magnetic switches 90 and 92 are mounted on the barrel 48. Switch 90 senses the position of piston 62 in the chamber 94 from the end cap 86 while switch 92 senses the position of piston 62 in the chamber 96 from the piston 54 so that it can be determined whether or not the mechanism is locked. This is an added safety feature.

The operation of the locking mechanism of the invention will now be described.

If the expandable room 22 is in the fully retracted and locked position shown in FIG. 3, the locking mechanism 38 will be in the position shown in the sectional view of FIG. 8. In this position, the locking projections 76 and 78 on the split ring 72 will be fully seated in the locking groove 44 in the receiver housing 40 and the locking groove 70 in the actuating mechanism housing 46. Since the receiver housing 40 is affixed to the frame members of the expandable room 22 and since the actuating mechanism housing 46 is affixed to the beams 14 of the vehicle, the expandable room will be held rigidly and securely in place. The strength of the locking projections 76 and 78 seated in the grooves 44 and 70 are sufficient to withstand all tensile and compressive forces that occur axially on the locking mechanism. In addition, the strength of the split ring 72 and mandrel 64 are sufficient to resist all shearing forces. The locking mechanism 38 therefore is designed to provide a connection between the framework of the vehicle and the expandable room that is just as rigid and strong as if the beams 14 in the side walls 12 were continuous and unbroken. However, with an expandable room of the size and weight utilized in many vehicles, when the room is retracted after being in the extended position, the expandable room 22 may not be perfectly aligned. If the expandable room 22 were then locked in a misaligned position, the structural rigidity would not be maintained. In fact, misalignment could prevent the locking mechanism from being, operable and being engaged in a fully locked position. Therefore, the locking mechanism of the invention has been designed to not only provide a strong and rigid connection, but the actuating mechanism will also properly align the expandable room if misalignment does occur. This is accomplished by designing the locking mechanism 38 so that it is a two-stage locking mechanism. This two-stage operation operations is as follows.

Figure 9:
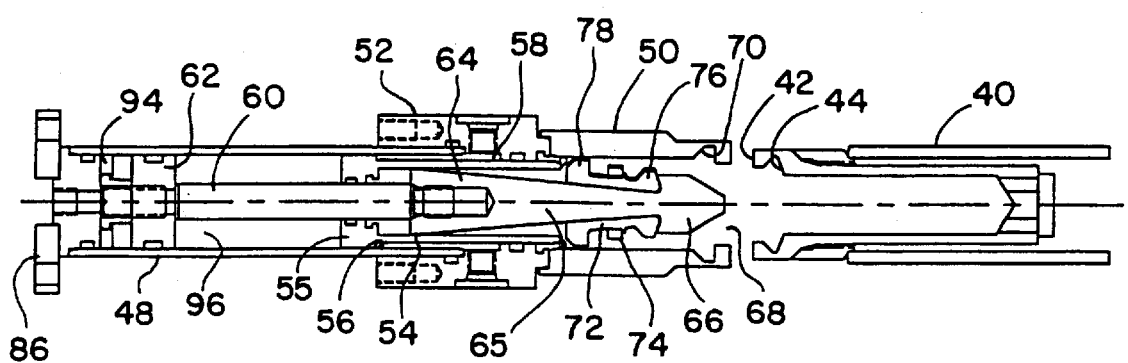
FIG. 9 is a side elevational view of the locking mechanism showing somewhat schematically the internal components of the locking mechanism when the mechanism is in the fully retracted and unlocked position.
Figure 10:
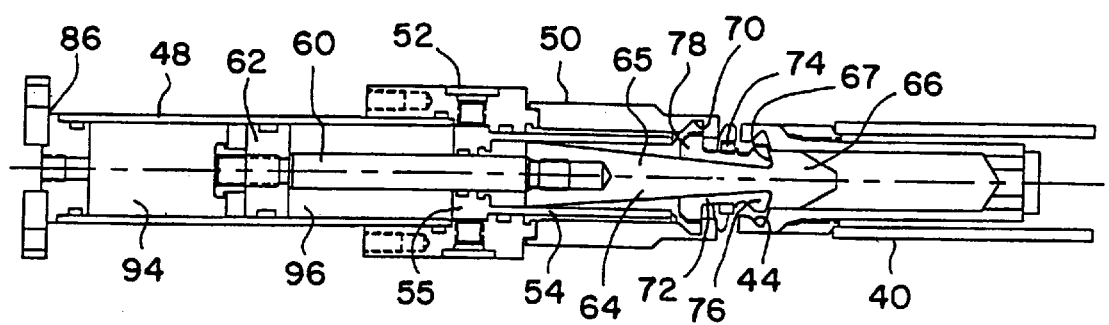
FIG. 10 is a view similar to FIG. 9 and illustrating the internal components of the locking mechanism in an intermediate position before the fully locked position.

When the expandable room 22 is fully retracted and the locking mechanism 38 is actuated by the hydraulic system, the components of the actuating mechanism 38 will be in the relative position shown in FIG. 9. At this time, hydraulic fluid rom the same source in the closed regenerative hydraulic system fills both chambers 94 and 96 advancing both pistons 62 and 54 simultaneously (to the right in FIG. 9). The rod 60 thus carries with it mandrel 64 carrying the split ring 72 which is seated against the shoulder 67 formed between the main body 65 and nose 66. The pistons 62 and 54 will continue to advance, and if the receiver housing 40 is not properly aligned with the open end 68 of the actuating mechanism housing 46, the nose 66 on the end of mandrel 64 will force the housings 40 and 46 into alignment as it enters the open end 42 of the receiver housing 40. FIG. 10 illustrates the nose 66 of the mandrel 64 as it just enters the receiver housing 40. As illustrated in FIG. 10, the locking projections 76 and 78 on the split ring 72 will then be properly aligned with the grooves 44 and 70. FIG. 10 illustrates that at this point the shoulder 56 on the piston 54 will engage the shoulder 56 in the rod guide 50 and stop further movement of the piston 54 and the split ring 72. As the mandrel 64 continues to advance under power of the force applied to the piston 62, the segments of the split ring 72 will be expanded by the tapered main body 65 of the mandrel 64. This will force the projections 76 and 78 of the split ring 72 into the respective locking grooves 44 and 70.

Thus, the locking mechanism of the invention will provide for proper alignment of the structural members to which it is attached, and once properly aligned, will positively lock the members together with the strength and rigidity sufficient to resist shear, tensile and compressive forces.

When it is desired to move the expandable room 22 to its expanded position, the foregoing described process is reversed. Hydraulic fluid is introduced into chamber 96 and exhausted from chamber 94 thus forcing the piston 54 rearwardly carrying with it the mandrel 64. Initially, the split ring 72 remains in the locked position with the projections 76 and 78 seated in the locking grooves 44 and 70. Then, as the mandrel 64 is withdrawn from the receiver housing 40, the spring 74 will gradually collapse the segments of the split ring 72 due to the taper of the main body 65 of the mandrel 64. This will withdraw the projections 76 and 78 from the locking grooves 44 and 70, and at the time that the shoulder 67 behind the nose 66 engages the split ring 72, the mandrel 64 will have engaged the base 55 which will force the piston 54 rearwardly to the fully retracted position shown in FIG. 9. The locking mechanism then is in position to start a return cycle into the locking position whenever the appropriate signal is received.

From the foregoing description, it will be evident the locking mechanism of the invention provides an improved lock for joining and positively locking together two members where it is desired to provide maximum strength and structural rigidity. The two-stage operation of the locking mechanism of the invention also provides for positive alignment and re-alignment of the members to be joined. This is an important feature in most applications, especially in the application with which the locking mechanism has been described above. In other words, where used in the application of expandable or extendable rooms for vehicles, it is extremely important that proper alignment be obtained to assure the structural rigidity and minimize the vibration forces when the vehicle is underway on the road. In addition, in the application. for expandable rooms for vehicles, the expandable room must be properly and tightly sealed from the elements when the room is fully retracted and locked in place. The locking mechanism of the invention assures the positive seal. Although the invention has been described in the application of an expandable room for vehicles, the locking mechanism of the invention can also be used in any application where it is desired to lock and unlock two structural members with structural strength and rigidity.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A locking mechanism for joining together first and second members that are moveable relative to each other from an unlocked position to a locked position in which the members are aligned and locked together, said locking mechanism comprising: a receiver adapted to be secured to the first member; the receiver having a wall that defines a receiving chamber with an open end; the wall having a first locking element within the receiving chamber; an actuating mechanism housing adapted to be secured to the second member and having an open end positioned to face the open end of the receiver housing when the first and second members are in a relative position to be locked together; the actuating mechanism housing having a second locking element near the open end of the housing; the actuating mechanism housing having a cylinder containing a barrel that defines a first chamber with a longitudinal axis; a first piston moveable forwardly and rearwardly in the first chamber along the longitudinal axis; a second piston axially moveable in the first chamber and spaced from the first piston to define a second chamber between the first piston and the second piston; the first piston having an annular wall extending forwardly to define a third chamber within the first piston; a mandrel having a rear end and a forward end received in the third chamber, said mandrel being moveable forwardly and rearwardly within the third chamber relative to the first piston; a connecting rod extending through the first piston and interconnecting the second piston and the rear end of the mandrel; the mandrel being comprised of a main body that is larger at the rear end of the mandrel than at the forward end; a locking member positioned on the main body of the mandrel and moveable axially relative to the main body; the locking member being normally positioned near the forward end of the main body and having a first locking element at the forward end of the locking member and a second locking element at the rear end of the locking member; the distance between the first and second locking elements of the locking member being the same as the distance between the first locking element in the receiver and the second locking element in the actuating mechanism housing when the receiver and housing are locked together; and means providing fluid under pressure into the first and second chambers for moving the first and second pistons to advance the forward end of the main body into the receiver and align the first and second locking elements of the locking member with the locking elements in the actuating mechanism housing and in the receiver and to force the locking elements together.

2. The locking mechanism of claim 1 in which the wall of the receiver is an annular wall, and the first locking element is a groove formed in the wall.

3. The locking mechanism of claim 2 in which the second locking element near the open end of the actuating mechanism housing is a groove formed in the housing.

4. The locking mechanism of claim 3 in which the first and second locking elements of the locking member are projections corresponding to the first and second locking grooves so as to nest in the locking grooves when in locked position.

5. The locking mechanism of claim 4 in which there is a nose at the forward end of the mandrel, the nose defining a shoulder between the nose and the main body of the mandrel, and the locking member is normally seated against the shoulder when in an unlocked position.

6. The locking mechanism of claim 5 in which the locking member is comprised of separate segments forming a split ring, and a spring surrounds the segments to maintain them on the main body of the mandrel.

7. The locking mechanism of claim 6 in which a shoulder is formed in the actuating mechanism housing rearwardly from the first locking groove of the housing, and the first piston engages the shoulder when moved forwardly to a locking position.

\* \* \* \* \*